Jan. 15, 1963  P. H. JOHNSON  3,073,878
DEFLUORINATION OF HF ALKYLATION REACTOR PRODUCT
Filed April 5, 1960  3 Sheets-Sheet 1

INVENTOR.
P. H. JOHNSON
BY Hudson and Young
ATTORNEYS

United States Patent Office 3,073,878
Patented Jan. 15, 1963

3,073,878
DEFLUORINATION OF HF ALKYLATION REACTOR PRODUCT
Paul H. Johnson, Bartlesville, Okla., assignor to Phillips Petroleum Company, a corporation of Delaware
Filed Apr. 5, 1960, Ser. No. 20,096
7 Claims. (Cl. 260—683.48)

This invention relates to the treatment of organic materials to remove therefrom fluorine-containing compounds. In one aspect this invention relates to an improved method for removing fluorine-containing compounds from the hydrocarbon products of a hydrocarbon conversion process wherein anhydrous HF is used as a conversion catalyst. In another aspect this invention is concerned with a combination of related and co-operative steps whereby the process of defluorination of the hydrocarbon is more completely and more efficiently performed.

In a process for the conversion of hydrocarbons wherein anhydrous hydrogen fluoride (HF) is employed as a catalyst there inevitably occur side reactions in addition to the desired conversion reaction. For example, hydrogen fluoride reacts with some of the hydrocarbons to form organic fluorides.

In an HF alkylation reaction, for example, the alkylation of isobutane with a buetene to form isooctane, the reactor effluent is fractionally distilled to remove low-boiling hydrocarbons from the alkylate. In those instances where the low-boiling hydrocarbons are recycled to the process or utilized as fuel, the presence therein of organic fluorides poses no problem. However, in those instances wherein the low-boiling hydrocarbons are utilized as a product, it is often necessary that these hydrocarbons be substantially free from hydrogen fluoride or organic fluorides.

It is therefore a principal object of this invention to provide a method for removing fluorine-containing compounds from low-boiling hydrocarbons recovered from an HF alkylation process. It is also an object of this invention to provide a method for removing fluorine-containing compounds from products of HF alkylation and recovery resulting hydrogen fluoride for reuse in the process. Other objects and advantages will become apparent to one skilled in the art upon study of the disclosure, including the detailed description of the invention and the attached drawing wherein.

Figure 1:
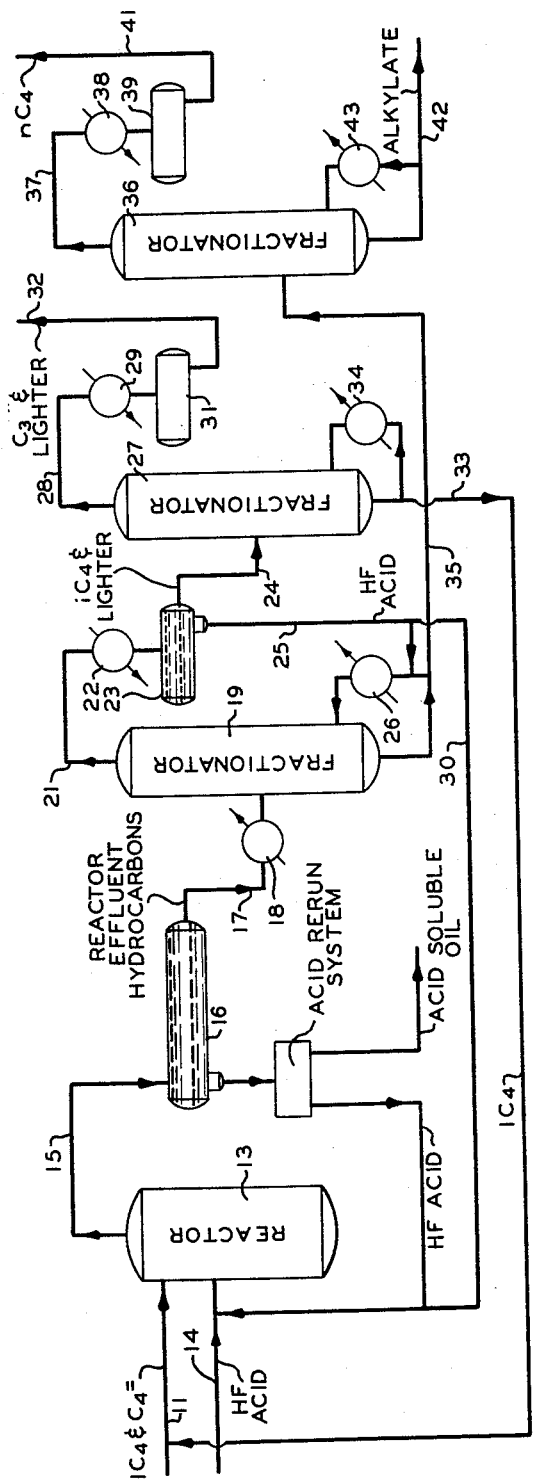
FIGURE 1 is a schematic flow sheet of an HF alkylation process having embodied therein the present invention.

I have now discovered that organic fluorides can be substantially completely decomposed in a unitary process by a novel combination of integrated steps. Thus, according to this invention, an organic fluoride-containing stream, e.g., the overhead product from a fractional distillation step following the alkylation reaction, can be condensed so as to form a liquid hydrocarbon phase and a liquid HF phase, and at least a portion of the HF phase can be passed to the reboiler of the fractional distillation step to catalyze the deocmposition of the orgnic fluorides. I have found that the organic fluorine-containing compounds which are present in the feed to a distillation step following an HF alkylation reaction can be decomposed by adding free HF to the reboiler of the distillation steps so that the HF catalyzes the decomposition of the organic fluorides. Attempts to decompose these organic fluorides thermally by reboiling the bottoms of a distillation step following the HF alkylation reaction have been only partly effective because of the limits on the temperature which can be attained in the reboiler. The addition of HF to the reboiler of such distillation step catalyzes the decomposition of the organic fluorides so that substantially complete decomposition of the HF-containing compounds is accomplished. The HF, after catalyzing the decomposition reaction then passes up the column and is condensed in the overhead product accumulator as a separate liquid phase which is heavier than the liquid hydrocarbon phase. The HF is then removed from the accumulator and returned to the reboiler. Excess HF, over that required to catalyze the defluorination reaction, can be returned to the alkylation reactor. At the start-up of the process it is necessary to inject substantially pure HF into the reboiler to catalyze the defluorination reaction until sufficient liquid HF is condensed in the accumulator to continue the process. After the initial injection of HF, the fluorine content of the feed is usually more than sufficient to provide the HF required for the defluorination reaction. The invention is applicable not only to treating a contaminated hydrocarbon in a distillation column but to treating an organic fluoride-containing hydrocarbon in a contacting zone with HF at elevated temperature.

The temperature required to catalyze the reaction will be in the range of about 150° F. to 450° F. and the preferred range will be that employed in the reboilers of the distillation steps following an alkylation reaction which is about 200° F. to 400° F.

Ordinarily, in an HF alkylation process wherein the first fractional distillation step is for the purpose of removing hydrocarbons lighter than alkylate overhead, this overhead stream will continue about 1000 to about 1200 p.p.m. of fluorine in the form of fluorine-containing compounds such as alkyl fluorides. By utilization of this invention the fluorine-containing compound content of this stream is reduced to about 200 to about 300 p.p.m. This reduction in fluorine-containing compounds is accomplished without changing the operating conditions of the alkylating process or of the fractional distillations steps which follow, and merely involves a phase separation in the distillation overhead accumulator and passage of the accumulated liquid HF to the reboiler of the distillation step. When the fluoride content of the hydrocarbon is lower than 1000 to 1200 p.p.m. the reduction in fluoride content by the practice of the invention will be proportionately as great as when the fluoride content is 100 to 1200 p.p.m.

Figure 3:
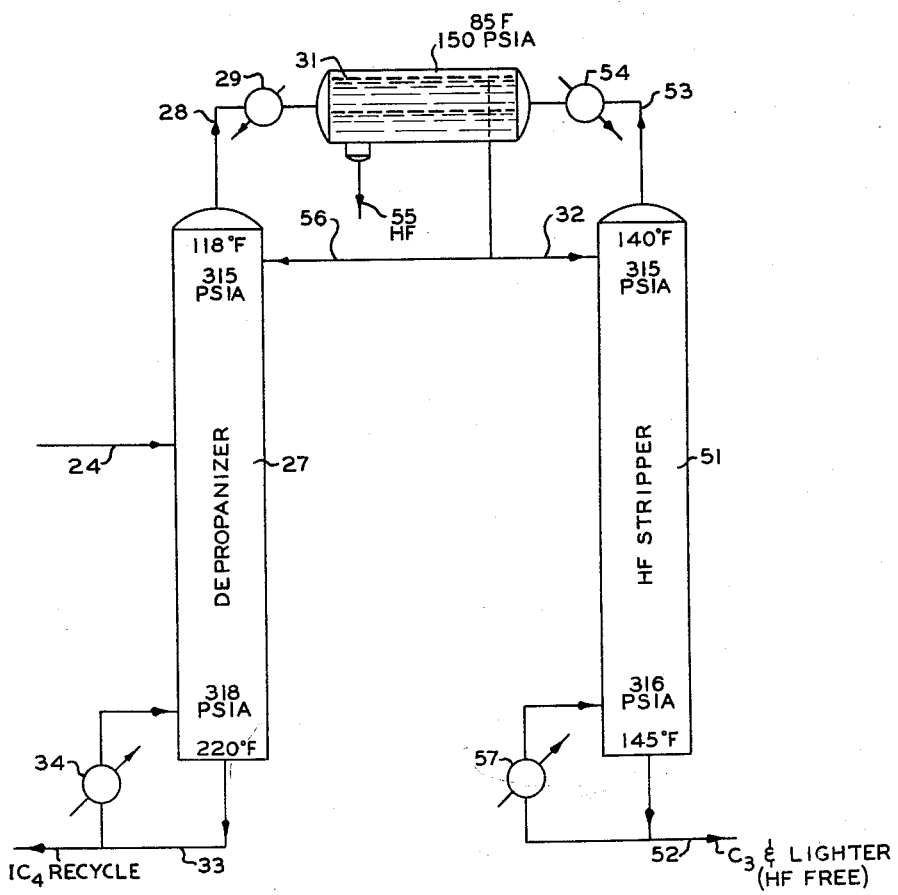
FIGURE 3 illustrates one method for stripping the propane and lighter stream.

In the schematic flow sheet of the HF alkylation process of FIGURE 1, the alkylation reactants enter the system via conduit 11. These reactants comprise a paraffin hydrocarbon having at least one tertiary carbon atom per molecule and an alkylating agent such as an olefin. For the sake of simplicity in this description various valves, pumps and other auxiliary equipment will not be illustrated, but those skilled in the art will readily be able to supply these because the alkylation reaction is well-known in the art. Also for the sake of simplicity, the reaction will be described as applied to isobutane and isobutylene although it is to be understood that the reaction is not limited thereto. These reactants pass into reactor 13 where they are intimately mixed with hydrofluoric acid which enters via conduit 14. The reactant effluent passes via conduit 15 to acid-settler or separator 16 wherein the reaction effluent is separated into an upper hydrocarbon phase and a lower acid phase. The hydrocarbon phase is passed through conduit 17 and heater 18 to fractionator 19 wherein a fractional distillation removes isobutane and lighter products overhead via conduit 21 and cooler 22 to accumulator 23 wherein a phase separation occurs. The lighter hydrocarbon phase comprising isobutane and lighter materials is removed via conduit 24 and the heavier acid phase is removed via conduit 25 and passed to reboiler 26 of fractionator 19. Isobutane and lighter hydrocarbons are passed via conduit 24 to fractionator 27 wherein a fractional distillation removes propane and lighter products overhead via conduit 28, cooler 29, accumulator 31 and conduit 32. This overhead product can be stripped to remove HF, which is present in a small amount because the feed to fractionator 27 was saturated with HF at the conditions existing in accumulator 23. FIGURE 3 illustrates one preferred method for stripping the HF from this stream, although other stripping methods can be employed if desired.

Isobutane is removed as the kettle product from fractionator 27 via conduit 33 and is recycled to conduit 11 where it joins the feed to reactor 13. A portion of the kettle product is reboiled in reboiler 34 and returned to fractionator 27.

The kettle product from fractionator 19 is removed via conduit 35 and passed to fractionator 36 wherein a fractional distillation removes normal butane overhead via conduct 37, cooler 38, accumulator 39 and conduit 41.

Alkylate product is removed from fractionator 36 via conduit 42. A portion of the alkylate product is reboiled in reboiler 43 and returned to fractionator 36.

Figure 2:
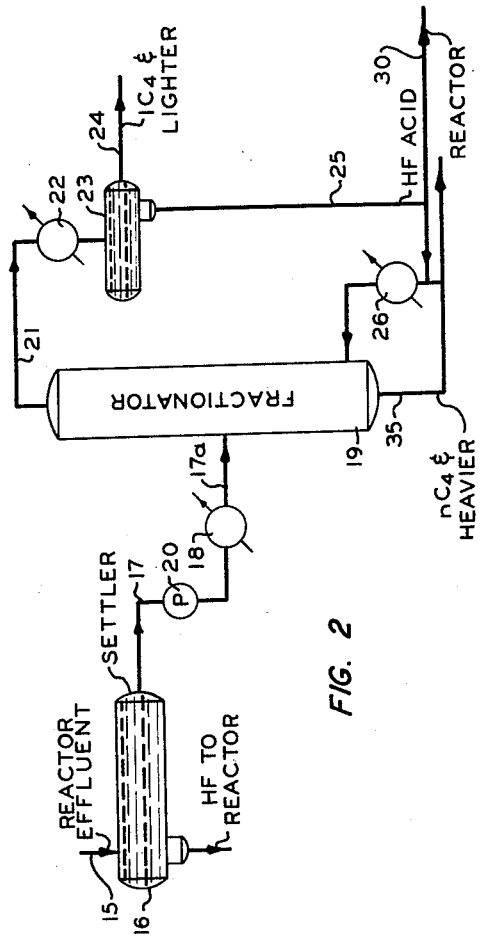
FIGURE 2 is a more detailed schematic flow sheet of the steps which comprise the invention.

Referring now to FIGURE 2, the reactor effluent passes to settler 16 via conduit 15 and a phase separation occurs in settler 16. Liquid HF is removed from the bottom of the settler. Liquid hydrocarbons are removed from the settler via conduit 17 and passed via pump 20, heater 18, and conduit 17a to fractionator 19 which is operated as a deisobutanizer, removing isobutane and lighter materials as overhead product via conduit 21 and cooler 22 to accumulator 23 wherein a phase separation occurs. Isobutane and lighter hydrocarbons are removed from the upper liquid layer via conduit 24 and passed to further separation steps as indicated in FIGURE 1. Liquid HF is removed from the lower liquid layer via conduit 25 and passed to reboiler 26 so as to catalyze the decomposition of fluorine compounds in reboiler 26 and fractionator 19. The HF passes up through fractionator 19 and is condensed and collected in accumulator 23. The kettle product comprising substantially fluorine-free normal butane and heavier hydrocarbons is passed via conduit 35 to further separation steps as indicated in FIGURE 1.

FIGURE 3 illustrates one method for stripping dissolved HF from the $C_3$ and lighter stream removed from fractionator 27 of FIGURE 1. The $C_3$ and lighter products are removed overhead from depropanizer 27 via conduit 28, cooled in heat exchanger 29 and passed to accumulator 31 where any free HF forms a separate liquid phase below the hydrocarbon phase. The hydrocarbon phase is passed via conduit 32 to HF stripper 51. HF free $C_3$ and lighter products are removed from the kettle or bottom of the stripper via conduit 52 and passed to storage or use. The stripper overhead product comprising HF is removed via conduit 53, cooled in heat exchanger 54 and passed to accumulator 31. Liquid HF is withdrawn from accumulator 31 via conduit 55 and passed to reboiler 26 of fractionator 19 or to reactor 13 as desired. A portion of the hydrocarbon stream is diverted from conduit 32 via conduit 56 as reflux for fractionator 27. Such reflux is conventional on all of the fractionators illustrated. The kettle of stripper 51 can be reboiled in reboiler 57 in conventional manner.

In the process illustrated in FIGURE 1, the first fractional distillation step is that of removing isobutane and lighter materials overhead and propane and lighter products are removed as the overhead product in the second fractional distillation step in fractionator 27. In some installations the first fractional distillation step is a depropanizing step wherein the overhead product comprises propane and lighted materials and the isobutane is separated from the alkylate in a subsequent distillation step. In any event, the present invention is usually practiced on the first fractional distillation step and comprises condensing the fractionator overhead product, collecting the condensate in an accumulator wherein a liquid phase separation occurs, and returning the acid phase, or at least a portion thereof, to the reboiler of the first fractional distillation step. In some installations, it may be desirable to divide the reactor effluent so that one portion passes to a depropanizer and a second portion passes to a deisobutanizer, in which case fluorine compounds would be present in the feed to each distillation step and the invention would be practiced on each distillation step.

Figure 4:
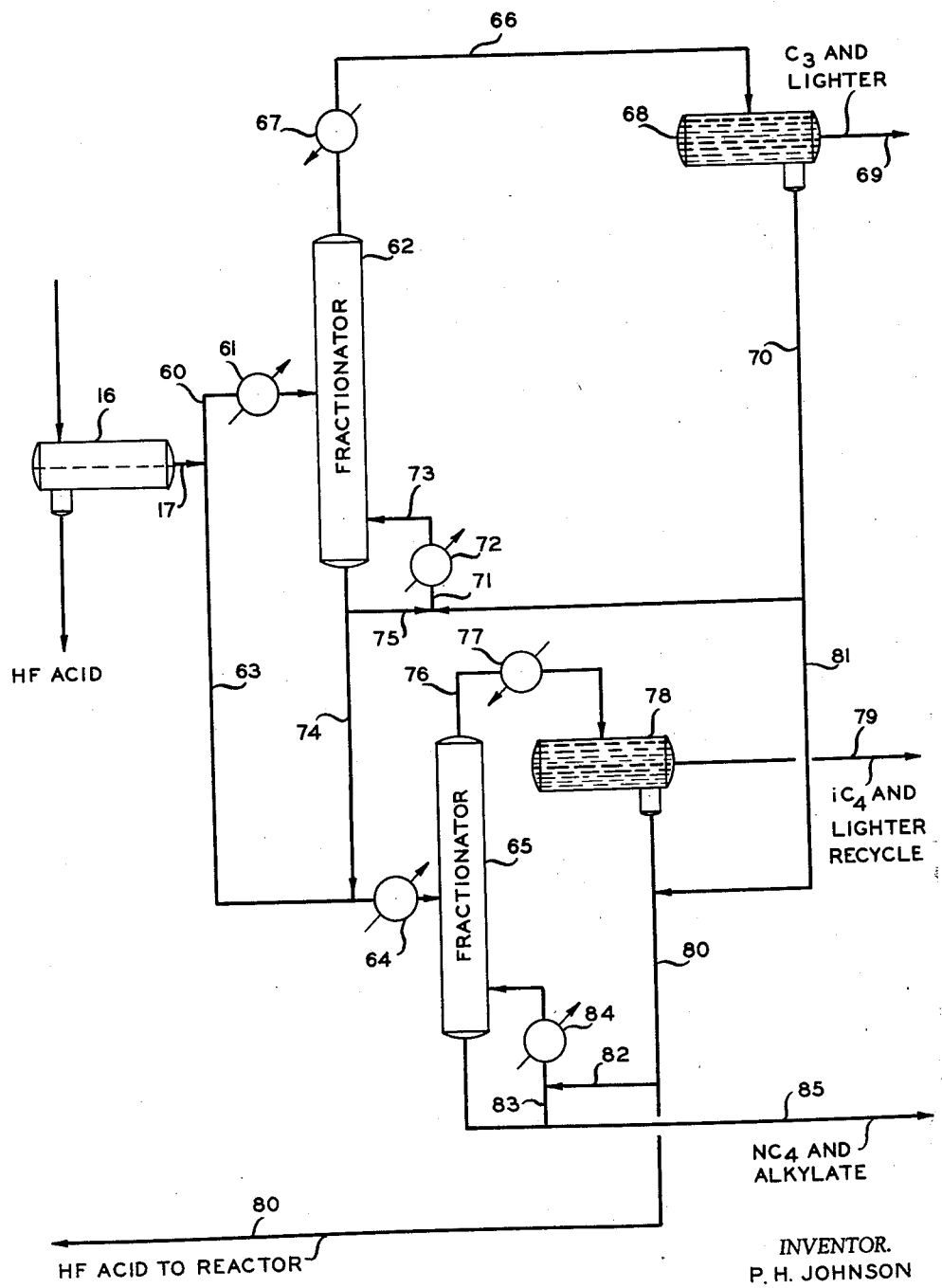
FIGURE 4 illustrates a modification of the invention.

FIGURE 4 illustrates a modification of the invention wherein the reactor effluent stream is divided between a depropanizer and a deisobutanizer. The stream in conduit 17 is divided so that a first portion of the stream passes via conduit 60 and heater 61 to depropanizer 62 and a second portion passes via conduit 63 and heater 64 to deisobutanizer 65. The overhead from depropanizer 62 passes via conduit 66 and condenser 67 to accumulator 68 where a liquid phase separation occurs. Propane and lighter materials are removed via conduit 69. Liquid HF is removed via conduit 70, a first portion being passed via conduit 71 to reboiler 72 of depropanizer 62. The kettle product from 62 is passed via conduit 74 to the feed conduit 63 of deisobutanizer 65. A portion of the kettle product is diverted via conduit 75 to reboiler 72.

The overhead product from deisobutanizer 65 passes via conduit 76 and condenser 77 to accumulator 78 where a phase separation occurs. Isobutane and lighter materials are removed via conduit 79 and recycled to the alkylation reactor. Liquid HF is removed via conduit 80. Excess HF removed from conduit 70 is passed to conduit 80 via conduit 81. HF acid is passed via conduits 80, 82 and 83 to reboiler 84 of deisobutanizer 65. Excess acid over that required in reboilers 72 and 84 continues via conduit 80 to be reused in the alkylation reactor. The kettle product from deisobutanizer 65, comprising normal butane and alkylate is passed via conduit 85 for further processing. The propane stream in conduit 69 and the alkylate stream in conduit 85 are substantially free of organic fluorides.

In some installations wherein the first distillation step is a depropanizing step and the overhead products from this distillation step are to be utilized in applications where the presence of fluorides is not objectionable, it may be desirable to practice the invention on a distillation step subsequent to the first distillation step. Thus, the invention is not limited to any particularly distillation step.

Typical operating conditions according to one installation of the invention are described herewith with reference to FIGURE 1, but it is to be understood that these operating conditions are exemplary and are not to be construed as unduly limiting the invention. Reactor 13 is operated at a temperature of 75° F. and 175 p.s.i.a. The temperature of the feed to fractionator 19 is raised to 165° F. and fractionator 19 is operated at a bottom temperature of 300° F., a top temperature of 160° F. and a top pressure of 160 p.s.i.a. Accumulator 23 is operated at 85° F. and 55 p.s.i.a. Fractionator 27 is operated at a bottom temperature of 220° F., a top temperature of 118° F. and a top pressure of 315 p.s.i.a. Accumulator 31 is operated at 85° F. and 150 p.s.i.a. Fractionator 36 is operated at a bottom temperature of 335° F., a top temperature of 145° F. and a top pressure of 100 p.s.i.a. Accumulator 39 is operated at 85° F. and 45 p.s.i.a.

The amount of HF required to accomplish the decomposition of the alkyl fluorides is quite small, being in the order of 1-2 volume percent of the hydrocarbon feed to the fractionator. It is preferred that about 1 to about 5 volume percent, based on the feed to the fractionater, of HF be added to the fractionator reboiler.

The invention is not limited to these small amounts, however, since an excess of HF does no harm and merely occupies fractionator space. Thus, the critical limitation on the HF added is that at least about 1 volume percent, based on the hydrocarbon feed to the fractionator, over the amount required to saturate the hydrocarbon of HF be added to the fractionator reboiler.

Reasonable variations and modifications are possible within the scope of this disclosure without departing from the spirit and scope of the invention.

That which is claimed is:

1. In a hydrofluoric acid alkylation reaction wherein the reaction effluent, consisting essentially of hydrocarbons and a minor amount of organic fluorine-containing compounds, is distilled in a distillation step including reboiling at least a portion of the kettle product to recover hydrocarbons lighter than alkylate as overhead product, the improvement comprising condensing the overhead product to form a liquid hydrocarbon phase and a liquid hydrofluoric acid phase; recovering the liquid hydrocarbon phase as overhead product of reduced organic fluorine-containing compounds content; recovering the kettle product; and passing a stream consisting essentially of kettle product and said liquid hydrofluoric acid to the reboiler section of the distillation step said acid being in an amount of at least about 1 volume percent, based on the hydrocarbon feed to the distillation step, over that required to saturate the hydrocarbon feed to the distillation step.

2. In the process of alkylating a paraffin with an alkylating agent in the presence of a hydrofluoric acid catalyst wherein the reaction product, containing organic fluorine compounds, is passed to a heating step and to a fractional distillation step, including reboiling at least a portion of the kettle product, to vaporize and remove therefrom materials lighter than alkylate, the improvement comprising condensing the vaporized material; collecting the condensate so as to form a liquid hydrocarbon phase and a liquid hydrofluoric acid phase; recovering the hydrocarbon phase as a product of the process of reduced organic fluorine compounds content; and passing a stream consisting essentially of kettle product and said liquid hydrofluoric acid phase to the reboiling step of the fractional distillation step said acid being in an amount of at least about 1 volume percent, based on the hydrocarbon feed to the distillation step, over that required to saturate the hydrocarbon feed to the distillation step.

3. The process of claim 2 wherein the acid phase passed to the reboiling step is from about 1 to about 5 volume percent, based on the feed to the distillation step, over that required to saturate the feed to the distillation step and the acid phase in excess of this amount is returned to the alkylating process.

4. The process of claim 2 wherein the reaction product is passed to a depropanizing distillation step.

5. The process of claim 2 wherein the reaction product is passed to a deisobutanizing distillation step.

6. The process of claim 2 wherein the reaction product is divided into two streams, one of which is passed to depropanizing distillation step and the other of which is passed to a deisobutanizing distillation step.

7. A process for reducing the organic fluorine-containing compounds contact of a hydrocarbon material containing same which comprises:

(1) passing said hydrocarbon material containing a minor quantity of said organic fluorine-containing compound to a distillation step including therein a kettle product reboiling zone;

(2) condensing the overhead product from said distillation step to form a liquid HF phase and a liquid hydrocarbon phase;

(3) recovering the liquid hydrocarbon phase as overhead product of reduced organic fluorine-containing compounds content; and (4) passing liquid HF from said liquid HF phase to the kettle product reboiling zone of the distillation step in an amount of at least about 1 volume percent, based on the hydrocarbon feed to the distillation step, over that required to saturate the hydrocarbon feed to the distillation step thereby heating said liquid HF passed to said zone to an organic fluorine-containing compound decomposition temperature.

References Cited in the file of this patent

UNITED STATES PATENTS

| | | |
|---|---|---|
| 2,372,338 | Penisten | Mar. 27, 1945 |
| 2,448,092 | Gibson | Aug. 31, 1948 |
| 2,463,077 | Zimmerman et al. | Mar. 1, 1949 |
| 2,636,912 | Leatherman | Apr. 28, 1953 |

UNITED STATES PATENT OFFICE
CERTIFICATE OF CORRECTION

Patent No. 3,073,878

January 15, 1963

Paul H. Johnson

It is hereby certified that error appears in the above numbered patent requiring correction and that the said Letters Patent should read as corrected below.

Column 6, line 15, before "depropanizing" insert -- a --; line 18, for "contact" read -- content --.

Signed and sealed this 3rd day of September 1963.

(SEAL)
Attest:

ERNEST W. SWIDER
Attesting Officer

DAVID L. LADD
Commissioner of Patents